(12) United States Patent  
Karan et al.

(10) Patent No.: US 7,660,609 B2
(45) Date of Patent: Feb. 9, 2010

(54) PERSISTENT TACTILE EVENT NOTIFICATION

(75) Inventors: Bilgi Karan, Malmö (SE); Claes Martin Källqvist, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 531 days.

(21) Appl. No.: 11/366,603

(22) Filed: Mar. 3, 2006

(65) Prior Publication Data

US 2007/0125636 A1 Jun. 7, 2007

Related U.S. Application Data (60) Provisional application No. 60/742,915, filed on Dec. 7, 2005.

(51) Int. Cl.
*H04M 1/00* (2006.01)
(52) U.S. Cl. .............. 455/567; 465/566; 465/575.1; 465/575.4; 465/90.3
(58) Field of Classification Search .............. 455/566, 455/567, 575.1, 575.4, 90.3
See application file for complete search history.

(56) References Cited

U.S. PATENT DOCUMENTS

| 5,663,703 | A | 9/1997 | Pearlman et al. |
| 5,719,561 | A | 2/1998 | Gonzales |
| 5,879,088 | A | 3/1999 | English |
| 6,035,035 | A | 3/2000 | Firooz |
| 2004/0183782 | A1 | 9/2004 | Shahoian et al. |
| 2004/0204150 | A1 | 10/2004 | Cho |

FOREIGN PATENT DOCUMENTS

| DE | 4140780 | | 9/1992 |
| DE | 19522769 | | 1/1996 |
| DE | 10128908 | | 12/2002 |
| EP | 1 422 913 | A2 | 5/2004 |

Primary Examiner—Temica M Beamer
(74) Attorney, Agent, or Firm—Harrity & Harrity, LLP (57) ABSTRACT

A method and apparatus for providing tactile event notification for an electronic apparatus is disclosed. When an event is detected in the electronic apparatus, a portion of the electronic apparatus is displaced in response to the event. An event can be any type of occurrence or alert in the electronic apparatus for which the user needs to be notified.

32 Claims, 5 Drawing Sheets

PERSISTENT TACTILE EVENT NOTIFICATION

RELATED APPLICATIONS

This application claims priority under 35 U.S.C. §119 based on U.S. Provisional Application Ser. No. 60/742,915, filed Dec. 7, 2005, the disclosure of which is incorporated herein by reference.

TECHNICAL FIELD OF THE INVENTION

The present invention relates to tactile event notification in an electronic apparatus. More specifically, a portion of the electronic apparatus is physically displaced in response to an event occurring in the electronic apparatus.

DESCRIPTION OF RELATED ART

The popularity and use of mobile terminals or mobile telephones has skyrocketed through the past 20 years. People now take their mobile terminals with them everywhere and use them for a multitude of functions. In addition to making and receiving telephone calls, the mobile terminals also may function as personal digital assistants, which have calendars, task managers, note managers and many other functions.

Typically, when an event e.g., a received message, telephone call, an alert from the task or note manager, etc., occurs, a message is displayed on the display of the mobile terminal. In addition, the mobile terminal may make a sound and/or vibrate to let the user know that an event has occurred. An issue with the visual event notification on the display is that the user needs to be able to see the display. This may be a problem when the mobile terminal is in the user's pocket or purse or is sitting out in bright light. An issue with the sound notification is that the sound lasts for only a short period of time and may not be heard if the user is in a noisy environment. An issue with the vibrating notification may be that it consumes a lot of power so it can't be used for long periods of time.

SUMMARY OF THE INVENTION

According to an embodiment of the invention, an electronic apparatus for tactile event notification comprises a processor adapted to detect an event; and a displacement device adapted to displace a portion of the electronic apparatus when the event is detected.

The displacement device may comprise least one solenoid coil with a displaceable core arranged to displace the portion of the electronic apparatus when the event is detected.

The electronic apparatus may comprise a plurality of keys, wherein at least one key may be arranged to be displaced by a first end of the solenoid coil when the event is detected.

A plurality of keys may be arranged to be displaced when the event is detected.

The electronic apparatus may comprise a switch for activating a visual notification of the event on a display, wherein the switch is arranged to be activated by a second end of the solenoid coil when the at least one key is brought back to a non-displaced position after having been in a displaced position.

A group of keys may be arranged to be displaced together to indicate a type of event.

An individual key may be arranged to be displaced to indicate a type of event.

A portion of a key may be arranged to be displaced when the event is detected.

Each key may be associated with a short-cut function.

A key to be displaced may be specifically selected when a detected event is a telephone call from a telephone number associated with a speed dial number for the key to be displaced.

The portion of the electronic apparatus may form a symbol when said portion is displaced.

The displacement device may comprise a membrane on a chassis of the electronic apparatus. The membrane may be arranged to be displaced by a first end of the displacement device when an event is detected.

The electronic apparatus may comprise a switch for activating a visual notification of the event on a display, wherein the switch is arranged to be activated by a second end of the displacement device when the membrane is brought back from a displaced position to a non-displaced position.

The membrane may be made of plastic or rubber.

The displacement device may be an electrical motor, which is arranged to displace a plurality of housing portions of the electronic apparatus in relation to each other when the event is detected.

The electrical motor may be arranged to displace the plurality of housing portions an amount, which is dependent on the importance of the event, which is detected. The amount of displacement may be dependent on the number of events that have been detected.

The displacement device may be arranged to repeatedly displace the portion a predetermined number of times when the event is detected.

The displacement device may be arranged to repeat the displacement of the portion for a predetermined number of times, which is dependent on the importance of the event.

The electronic apparatus may comprise a display. A visual notification of the event may be displayed on the display when the housing portions are moved from their displaced position.

The electronic apparatus may be a mobile terminal.

The electronic apparatus may be a watch.

The displacement device may comprise an air chamber with a displaceable section: and a pressurization device for pressurizing the air chamber when the event is detected. The displaceable section may be arranged to be displaced when the air chamber is pressurized.

The air chamber may be positioned at the back of a watch or watchstrap.

The displaceable section of the air chamber may be positioned on a chassis of the electronic apparatus.

The displacement device may comprise a plurality of piezo-electric materials and a voltage device wherein the piezo-electric materials are arranged to be fed with opposite voltages to cause one piezo-electric material to expand and the other piezo-electric material to contract when the event is detected.

The electronic device may be a mobile terminal. The mobile terminal may be a watch. The back of the watch or a watchstrap may comprise the piezo-electric materials.

The displacement device may comprise a slidable button. The slidable button may be arranged to be displaced when the event is detected.

The displacement device may comprise a cover on the electronic apparatus. The cover may be displaced when the event is detected.

The electronic apparatus may comprise a display, which may be covered by the cover when the cover is positioned in a non-displaced position. The display may be adapted to display a message regarding the event when the cover is positioned in a displaced position.

The processor may be adapted to detect at least one event in of the group including: receiving a message, receiving a telephone call; an alert, an alert of a calendar entry of a calendar, a note entry of a note manager, or a task entry of a task manager.

The electronic apparatus may be a wireless accessory to a mobile terminal.

According to another embodiment, a method for providing tactile event notification for an electronic apparatus comprises the steps of detecting an event; and displacing a portion of the electronic apparatus in response to detecting the event.

Further embodiments of the invention are defined in the dependent claims.

The electronic apparatus may be a mobile terminal, which comprises a portable or handheld mobile radio communication equipment, a mobile radio terminal, a mobile telephone, a smartphone, a communicator, or any other electronic apparatus with wireless communication capabilities.

Some embodiments of the invention provide for tactile event notification to alert user of an event. This is, e.g., useful when other notification mechanisms may not be noticed or cannot be used. Some embodiments of the invention also provide for tactile event notification that is persistent.

BRIEF DESCRIPTION OF THE DRAWINGS

Further objects, features and advantages of the invention will appear from the following detailed description of the invention, reference being made to the accompanying drawings, in which.

DETAILED DESCRIPTION OF EMBODIMENTS

Embodiments of the invention will be described with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular embodiments illustrated in the accompanying drawings is not intended to be limiting of the invention. In the drawings, like numbers refer to like elements.

A general concept of the invention is to displace a portion of an electronic apparatus in response to an event occurring in the electronic apparatus. An event can be any type of occurrence or alert in the electronic apparatus for which the user needs or might need to be notified. For example, an event may be receiving a message, receiving a telephone call, an alert, an alert of a calendar entry in a calendar, note entry of the note manager, task entry of task manager, etc., but the invention is not limited thereto.

The displacement of a portion of the electronic apparatus may be maintained for any length of time. Even if the displacement is only maintained for a short period of time, this type of notification may be beneficial over audio/visual/vibration notification, for example, in noisy environments. In addition, the displacement can be repeated any number of times for the same event.

The invention will now be described with reference to several different embodiments for providing tactile notification. The embodiments will make reference to a variety of electronic apparatuses such as mobile terminals. The mobile terminals may be a portable or handheld mobile radio communication equipment, a mobile radio terminal, a mobile telephone, a communicator, a smartphone or any other electronic device in which notification of events is desired.

Figure 1A:
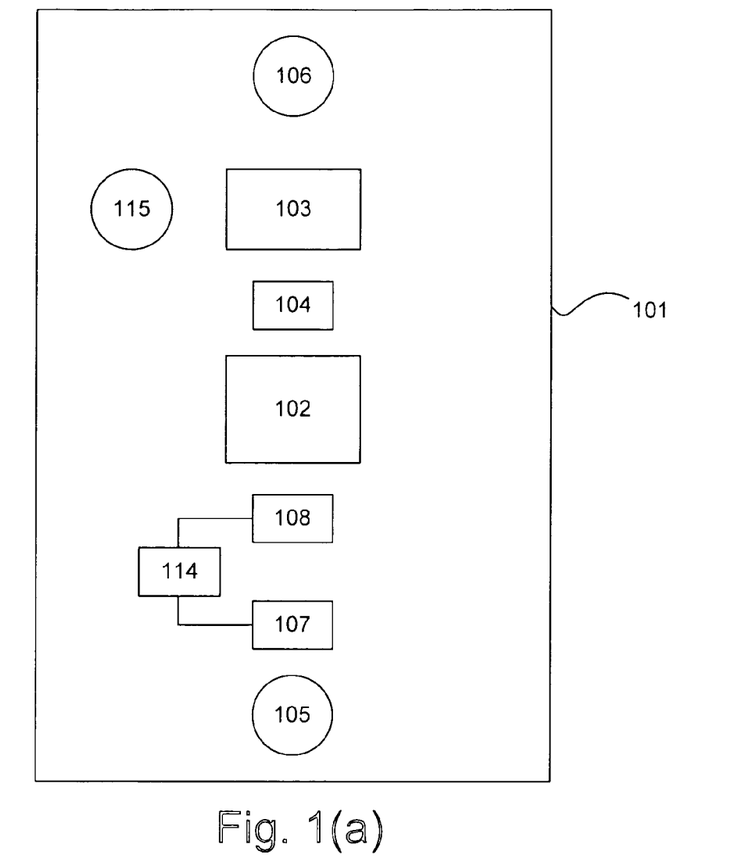
FIG. 1(a) is a block diagram of a mobile terminal according to one embodiment of the invention.
Figure 1B:
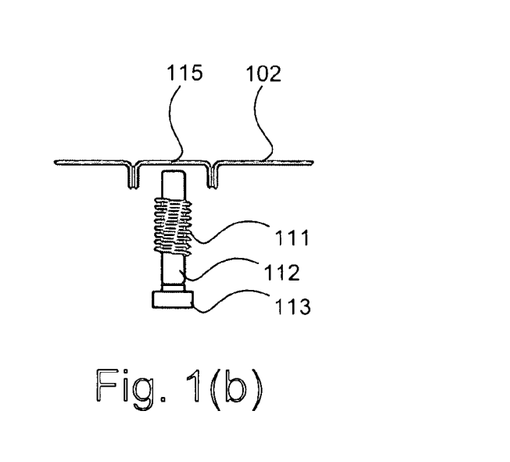
FIGS. 1(b)-1(c) are schematic views of a displacement device according to an embodiment of the invention.
Figure 1C:
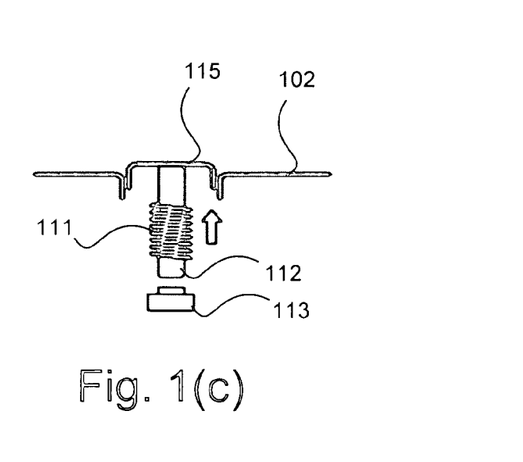

FIGS. 1(a)-1(c) illustrate a mobile terminal 101 according to one embodiment of the invention. The mobile terminal 101 may comprise a man-machine interface, such as a keypad 102, a display 103, a joystick 104, a microphone 105 and a loudspeaker 106, through which a user may interact with the mobile terminal 101. The mobile terminal 101 may be connected to a network (not illustrated).

The mobile terminal 101 may comprise various applications for carrying out functions within the mobile terminal 101. The applications may be provided within an operational platform. Alternatively or additionally, the applications may be provided within a communication platform. The operational platform may comprise systems software run by an application processor, such as a CPU 107 (Central Processing Unit), which may also be referred to as the ACPU (Application CPU). Similarly, the communication platform may comprise both hardware and software for carrying out, e.g., communication with the network. Thus, also the communication platform may comprise a CPU, which may be referred to as a CCPU, (Communication CPU), for providing various applications. The ACPU and the CCPU may run different operational systems. Also, the communication platform and the operational platform may interact to exchange information.

The mobile terminal 101 also comprises a displacement device 108. In this embodiment, the displacement device comprises a solenoid/coil 111 with a displaceable core 112 but the invention is not limited thereto. When the event occurs, it is detected by the processor 107. The processor 107 then drives the solenoid/coil 111 with power from the battery 114. As a result, the extendable core 112 extends out or is in a displaced position and displaces a portion of the mobile terminal 101, which provides a tactile notification to a user that an event has occurred.

For example, the displacement device 108 may be located below one or more of the keys on the keypad 102 or under a button 115. As a result, when the displaceable core is extended or in the displaced position, the displaceable core may displace one or more of the keys on the keypad 102 or the button 115 as illustrated in FIGS. 1(b)-1(c). Each key or button may be independently displaceable. Alternatively, groups of keys may be displaceable together. Furthermore different keys or groups of keys can be displaced to distinguish between different types of events. A group of keys may be displaced to indicate that a specific type of event has occurred or been detected. For example, keys "1"+"2"+"3" may be displaced to indicate that a message has been received, while keys "4"+"5"+"6" may be displaced to indicate that a call has been received. Alternatively, a single key may be used to indicate that a certain type of event has been detected or occurred. Furthermore, only a certain portion of the displaced portion of the electronic apparatus, such as the key or button, may be displaced and may form a symbol or letter.

As mentioned above, each individual key on the keypad 102 may be displaced. Each key may be associated with a short cut, e.g., speed dial, and may be used to indicate various information to the user. For example, key "8" may be programmed or associated with a certain telephone number such as the cell phone number of the user's spouse. When a call or message is received from this telephone number, the key "8" may be displaced to let the user know that their spouse is calling or have called on their cell phone.

As illustrated in FIGS. 1(b)-1(c), the mobile terminal 101 may also comprises a switch 113. When an event occurs, a first end of the displaceable core 112 displaces one or more of the keys on the keypad 102 or the button 115. When the displaced key is pressed back into its non-displaced position by the user, the second end of the displaceable core may contact and activate the switch 113. When the switch 113 is activated, the mobile terminal 101 may display a visual message or notification on the display 103 regarding the event or activate a new event list in the software of the mobile terminal 101. Furthermore, the visual message may be presented in association with a user interface or application, such as a message application. In the application, shortcuts to perform tasks may be presented in menus appearing in the display together with or in association with the message. For example, a "write message" application may appear together or in association with displaying of an incoming message.

While only a single solenoid coil 111 with a displaceable core 112 has been illustrated, it will be understood by those skilled in the art that multiple solenoids/coils and displaceable cores may be used in the mobile terminal 101 to displace a multitude of keys or buttons and the invention is not limited thereto. Furthermore, the amount of displacement of the key(s) or button may vary for each type of mobile terminal. In addition, the amount of displacement may be a function of the number of events and/or the importance of the event, but the invention is not limited thereto.

Figure 2A:
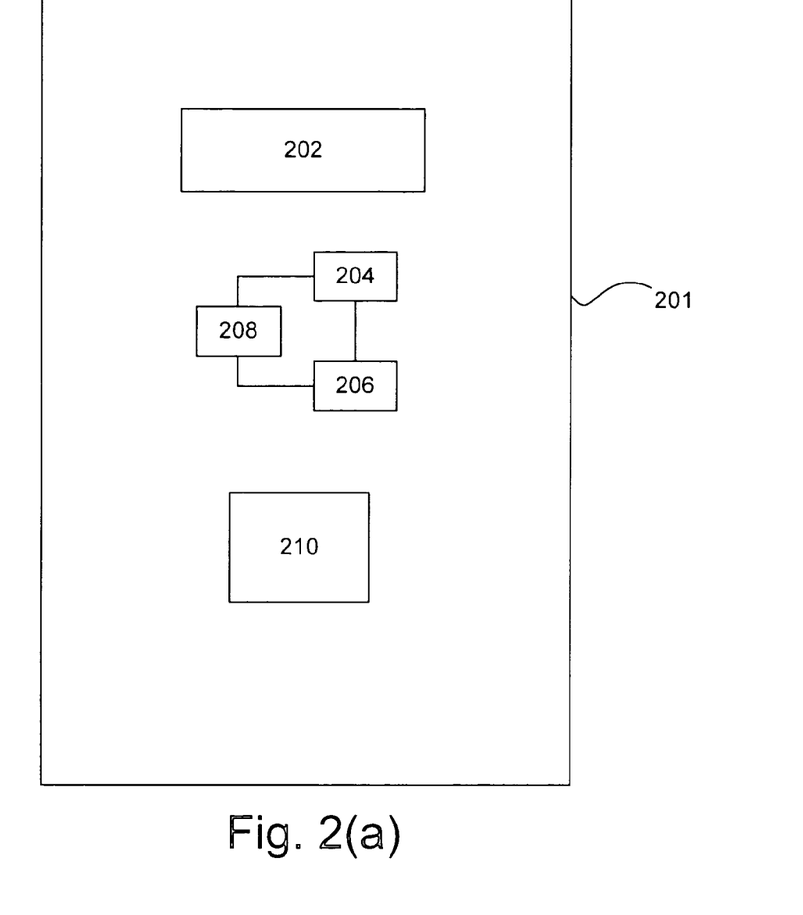
FIG. 2(a) is a block diagram of a mobile terminal according to another embodiment of the invention.
Figure 2B:
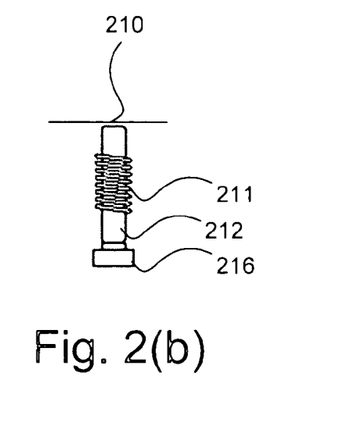
FIGS. 2(b)-2(c) are schematic views of a displacement device according to another embodiment of the invention
Figure 2C:
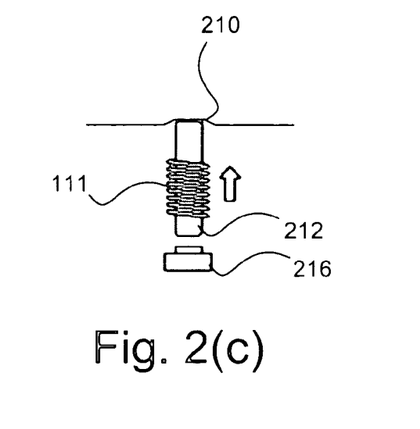

FIGS. 2(a)-2(c) illustrate a mobile terminal 201 according to another embodiment of the invention. In addition to a keypad, joystick, microphone and loudspeaker which are not illustrated, the mobile terminal 201 comprises, among other features, a display 202, a processor 204, a displacement device 206 (solenoid/coil 211 and displaceable core 212) and a battery 208. The mobile terminal 201 also comprises a membrane 210 located somewhere on the chassis of the mobile terminal 201. The membrane 210 may be made of plastic, rubber or any other flexible material. When an event occurs, the processor 204 detects the event. The processor 204 then drives the solenoid/coil 211 with power from the battery 208. As a result, the displaceable core 212 moves from its non-displaced position illustrated in FIG. 2(b) to a displaced Position illustrated in FIG. 2(c). The displaced core 212 displaces the membrane 210 which provides tactile notification to a user that an event has occurred.

As illustrated in FIGS. 2(b)-(c), the mobile terminal may also comprise a switch 216. When an event occurs, a first end of the displaceable core 212 displaces the membrane 210. When the displaced membrane is pressed back into its non-displaced position by the user, the second end of the displaceable core may contact and activate the switch 216. When the switch 216 is activated, the mobile terminal 201 may display a visual message or notification on the display 202 regarding the event or activate a new event list in the software of the mobile terminal 201.

While only a single solenoid coil 211 with a displaceable core 212 has been illustrated, it will be understood by those skilled in the art that multiple solenoids/coils and displaceable cores may be used in the mobile terminal 201 to displace the membrane in a plurality of places and the invention is not limited thereto.

Figure 3A:
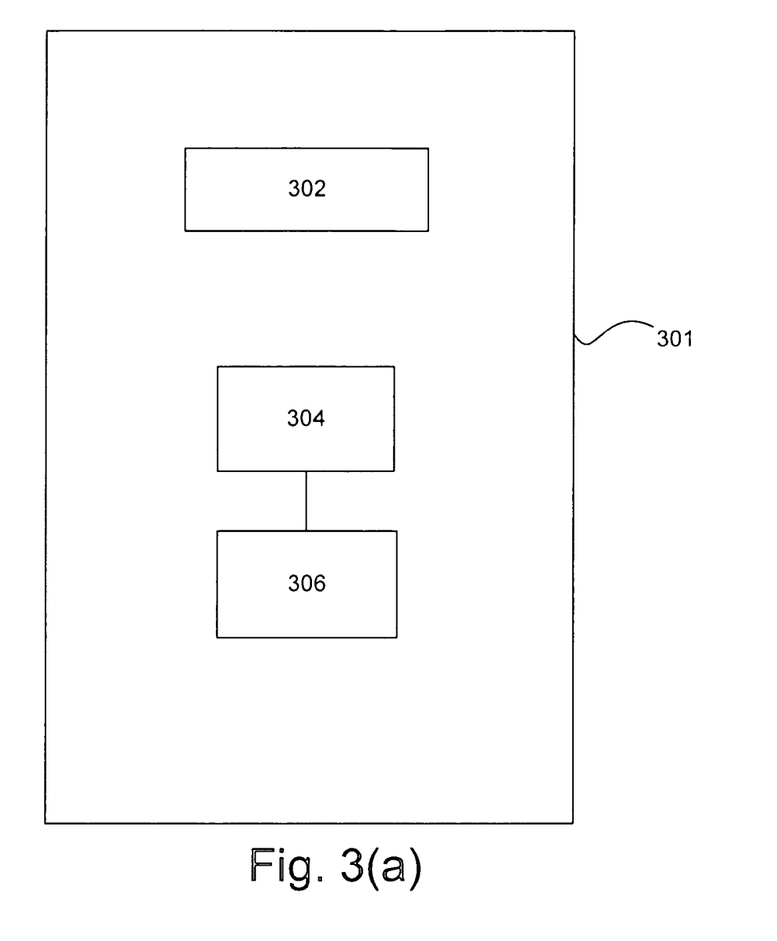
FIG. 3(a) is a block diagram of a mobile terminal according to another embodiment of the invention.
Figure 3B:
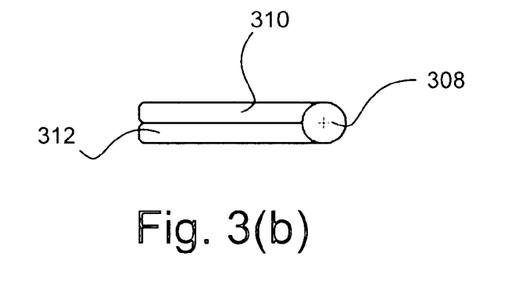
FIGS. 3(b)-3(c) are side views of a mobile terminal according to another embodiment of the invention.
Figure 3C:
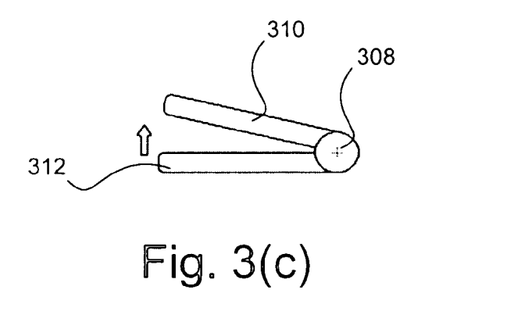

FIGS. 3(a)-3(c) illustrate a mobile terminal 301 according to another embodiment of the invention. The mobile terminal comprises a plurality, such as a first and a second, of housing portions that are displaceable in relation to each other. For a clam shell/jack knife/slidable/rotatable/twistable type of electronic apparatus, the displacement device may comprise an electric motor that may be provided to displace the housing portions of the electronic apparatus in relation to each other. This is exemplified by a clam shell type mobile terminal 301. A notification may be notified by displacing the housing portions in relation to each other. The displacement may be provided by displacing the housing portions a predefined number of degrees in relation to each other. This amount of displacement may be proportional to the number of events detected and/or the importance of the detected event(s). The displacement of the housing portions provides a tactile notification of to the user that an event has occurred.

As illustrated in FIG. 3(a), the mobile terminal 301 comprises, among other features, a display 302, a processor 304 and an electrical motor 306. In addition, as illustrated in FIGS. 3(b)-(c), the mobile terminal 301 also comprises two housing portions 310, 312 and a hinge/swivel 308. When the processor 304 detects an event, the processor 304 drives the electrical motor 306, which causes the two housing portions to move relative to each other. As illustrated in FIG. 3(c), the hinge 308 opens as the two housing portions 310, 312 move apart in the vertical plane. Likewise if a swivel 308 is provided, the two housing units 310, 312 will move apart in a horizontal plane like hands on a clock (not illustrated). When the user moves the two housing portions from their displaced positions, the mobile terminal may display a visual notification regarding the detected event(s) on the display 302.

Figure 4A:
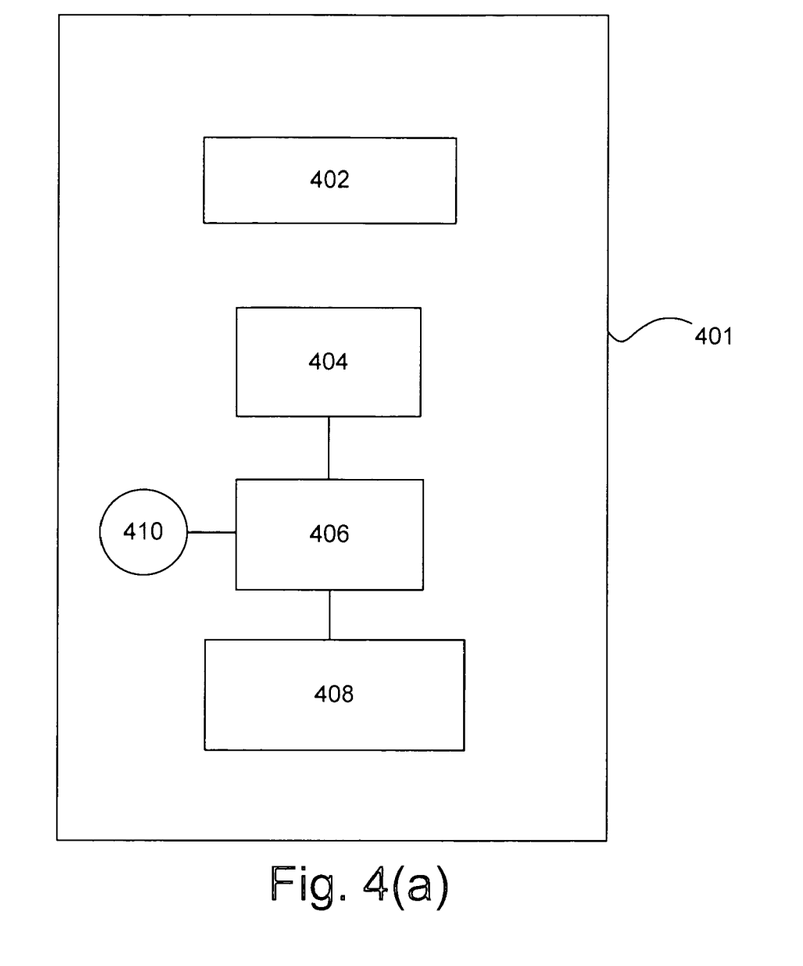
FIG. 4(a) is a block diagram of a mobile terminal according to another embodiment of the invention.
Figure 4B:
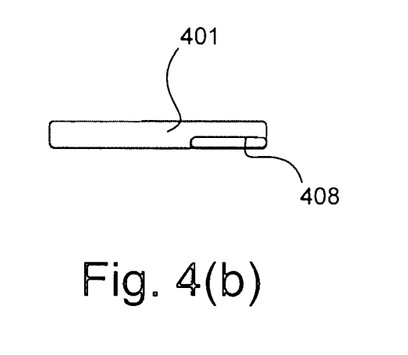
FIGS. 4(b)-4(c) are side views of a mobile terminal according to another embodiment of the invention.
Figure 4C:
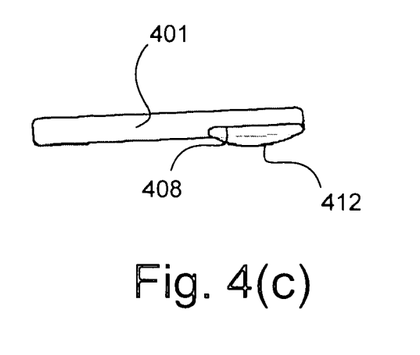

FIGS. 4(a)-4(c) illustrate a mobile terminal 401 according to another embodiment of the invention. In this embodiment, the mobile terminal 401 comprises, among other feature, a display 402, a processor 404. The displacement device of the embodiments of FIGS. 4(a)-4(c) comprises a pressurization device 406, an air chamber 408 and an air inlet/outlet 410. The air chamber 408 has a displaceable section. The displaceable section may comprise a membrane or some other displaceable section 412, for example on one side of the air chamber 408. The membrane may, e.g., be a rubber membrane. In its normal condition, the air chamber 408 is not pressurized or inflated as illustrated in FIG. 4(b). When the processor 404 detects an event, the processor 404 instructs the pressurization device 406 to inflate the air chamber 408. The air chamber 408 may be inflated with air from the air inlet 410 but the invention is not limited thereto. As a result, the shape of the mobile terminal 401 is altered which may provide an indication or notification to the user that an event has been occurred, as is illustrated in FIG. 4(c).

According to one embodiment of the invention, the mobile terminal 401 may be provided in a watch. In this embodiment, the displaceable portion of the air chamber may be located on the back of the watch or on a watch band. Thus, the user will immediately feel when the event occurs.

Figure 5A:
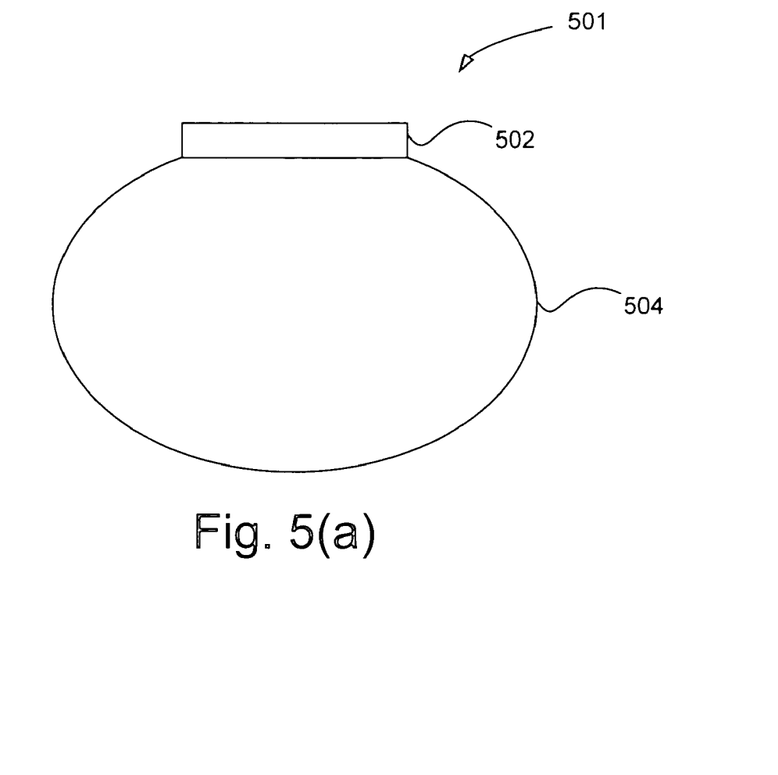
FIG. 5(a) is a side view of an electronic apparatus according to another embodiment of the invention.
Figure 5B:
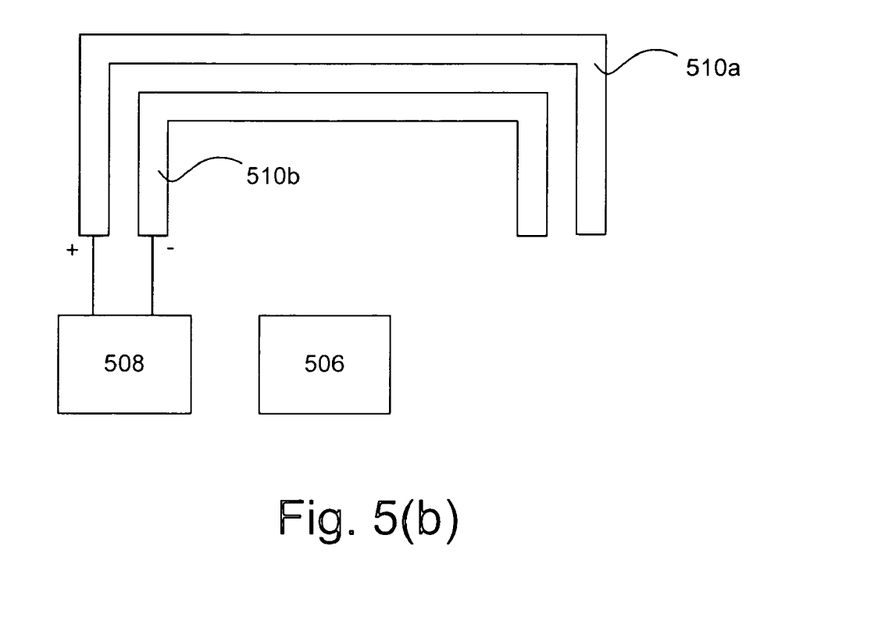
FIG. 5(b) is a block diagram of a displacement device according to another embodiment of the invention.

FIGS. 5(a)-5(b) illustrate a watch mobile terminal 501 according to another embodiment of the invention. The mobile terminal 501 comprises, among other features, a watch face and body 502, a watch band 504, a processor 506, a battery 508 and a plurality of piezo-electric materials 510a, 510b. The processor 506 and the battery 508 may form a voltage device for generating a voltage to be applied to the piezo-electric materials.

For example, there may be two piezo-electric materials 510a, 510b as illustrated in FIG. 5(b). Piezo-electric materials 510a. 510b either expand or contract when a positive or negative voltage is applied to the material. In this embodiment of the invention, the piezo-electric materials 510a. 510b may be provided on the back of the watch body 502 or on the watch band 504. When the processor 506 detects an event the processor 506 drives the battery 508 to provide a positive voltage to one of the piezo-electric materials 510a and a negative voltage to the other piezo-electric material 510b. This will cause the piezo-electric materials 510a. 510b to expand and contract. thus causing displacement of the piezo-electric material 510a, 510b. As a result, the user will immediately feel when the displacement occurs.

The displacement device may comprise a slidable button or a moveable cover. The slidable button or moveable cover button may be displaced in response to detecting an event. The moveable cover may, e.g., be a cover of a display. When the moveable cover has been displaced, the display may be activated and a message relating to the event may be rendered.

The invention has been described above with reference to various embodiments. However, features from one embodiment may be integrated in or replace other features of another embodiment. For example, a key may be displaced using other means than a solenoid coil and a core. Instead, an air chamber and a pressurizing device may be positioned within the mobile terminal and act on the key in the inflated state of the air chamber to displace the key. Also, in each of the embodiments, the displacement may be repeated a predetermined number of times, for example dependent on the importance of the event. The importance of the event may, e.g., be indicated or set in a calendar, a message, etc. Furthermore, in some of the embodiments the tactile notification is persistent. That is, the displacement is maintained until, e.g. until it is manually reverted to the non-displaced position. Furthermore, embodiments of the invention provides for tactile as well as visual notification of the event. When the portion of the mobile terminal, which is displaced, is visible to the user, visual as well as tactile notification is provided. This may e.g. be useful if the mobile terminal is placed on a desk, wherein the user visually may be notified of the event.

Furthermore, reference has been made to a mobile terminal above. However, an electronic apparatus according to embodiments of the invention may also be embodied as a wireless accessory device for interconnection with a mobile terminal or mobile telephone. The wireless accessory device may, e.g., be the watch.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, a "mobile terminal" includes both devices having only a wireless signal receiver without transmit abilities and devices having both receive and transmit hardware capable of two-way communication over a two-way communication link. Such devices may include cellular or other communications devices with or without a multi-line display: Personal Communications System (PCS) terminals that may combine a voice and data processing, facsimile and/or data communications capabilities: Personal Digital Assistants (PDA) that can include a radio frequency receiver and a pager. Internet/Intranet access. Web browser, organizer, calendar and/or a global positioning system (GPS) receiver; and/or conventional laptop and/or palmtop computers or other appliances, which include a radio frequency receiver. As used herein, "mobile terminal" may be portable, transportable, installed in a vehicle (aeronautical, maritime, or land-based), or situated and/or configured to operate locally and/or in a distributed fashion at any other location(s) on earth and/or in space.

The present invention has been described above with reference to specific embodiments. However, other embodiments than the above described are equally possible within the scope of the invention. Different method steps than those described above, performing the method by hardware or software, may be provided within the scope of the invention. The different features and steps of the invention may be combined in other combinations than those described. The scope of the invention is only limited by the appended patent claims.

What is claimed is:

1. An electronic apparatus for tactile event notification, comprising:
   a processor to detect an event;
   a displacement device to displace a portion of the electronic apparatus when the event is detected, where the displacement device comprises at least one solenoid coil with a displaceable core to displace the portion of the electronic apparatus when the event is detected;
   a plurality of keys, where at least one key is to be displaced by a first end of the solenoid coil when the event is detected; and
   a switch for activating a visual notification of the event on a display, where the switch is to be activated by a second end of the solenoid coil when the at least one key is brought back to a non-displaced position after having been in a displaced position;
   where the displacement device is to repeatedly displace the portion a predetermined number of times when the event is detected.

2. The electronic apparatus according to claim 1, where a plurality of keys are to be displaced when the event is detected.

3. The electronic apparatus according to claim 1, where a group of keys is to be displaced together to indicate a type of event.

4. The electronic apparatus according to claim 1, where an individual key is to be displaced to indicate a type of event.

5. The electronic apparatus according to claim 1, where a portion of a key is to be displaced when the event is detected.

6. The electronic apparatus according to claim 1, where each key is associated with a short-cut function.

7. The electronic apparatus according to claim 6, where a particular key to be displaced is specifically selected when a detected event is a telephone call from a telephone number associated with a speed dial number for the key to be displaced.

8. The electronic apparatus according to claim 1, where the portion of the electronic apparatus forms a symbol when said portion is displaced.

9. The electronic apparatus according to claim 1, where the displacement device comprises:
   a membrane on a chassis of the electronic apparatus, where the membrane is to be displaced by a first end of the displacement device when an event is detected.

10. The electronic apparatus according to claim 9, where the switch is further to be activated by a second end of the displacement device when the membrane is brought back from a displaced position to a non-displaced position.

11. The electronic apparatus according to claim 9, where the membrane is made of plastic or rubber.

12. The electronic apparatus according to claim 1, where the displacement device is an electrical motor, which is to displace a plurality of housing portions of the electronic apparatus in relation to each other when the event is detected.

13. The electronic apparatus according to claim 12, where the electrical motor is to displace the plurality of housing portions an amount, which is dependent on the importance of the detected event.

14. The electronic apparatus according to claim 12, where the amount of displacement is dependent on the number of events that have been detected.

15. The electronic apparatus according to claim 1, where the predetermined number of times, is dependent on the importance of the event.

16. The electronic apparatus according to claim 12, comprising a display where a visual notification of the event is displayed on the display when the housing portions are moved from their displaced position.

17. The electronic apparatus according to claim 1, where the electronic apparatus is a mobile terminal.

18. The electronic apparatus according to claim 1, where the electronic apparatus is a watch.

19. The electronic apparatus according to claim 1, further comprising:
   an air chamber with a displaceable section; and
   a pressurization device for pressurizing the air chamber when the event is detected,
   where the displaceable section is to be displaced when the air chamber is pressurized.

20. The electronic apparatus according to claim 19, where the air chamber is positioned at the back of a watch or watchstrap.

21. The electronic apparatus according to claim 19, where the displaceable section of the air chamber is positioned on a chassis of the electronic apparatus.

22. The electronic apparatus according to claim 1, where the displacement device comprises a plurality of piezo-electric materials and a voltage device, where the piezo-electric materials are to be fed with opposite voltages to cause one piezo-electric material to expand and another piezo-electric material to contract when the event is detected.

23. The electronic apparatus according to claim 22, where the electronic device is a mobile terminal.

24. The electronic apparatus according to claim 23, where the mobile terminal is a watch, where the back of the watch or a watchstrap comprises the piezo-electric materials.

25. The electronic apparatus according to claim 1, where the displacement device comprises:
   a slidable button, where the slidable button is to be displaced when the event is detected.

26. The electronic apparatus according to claim 1, where the displacement device comprises:
   a cover on the electronic apparatus, where the cover is displaced when the event is detected.

27. The electronic apparatus according to claim 26, further comprising:
   a display, which is covered by the cover when the cover is positioned in a non-displaced position, where the display is to display a message regarding the event when the cover is positioned in a displaced position.

28. The electronic apparatus according to claim 1, where the processor is to detect at least one event in the group including: receiving a message, receiving a telephone cal, an alert, an alert of a calendar entry of a calendar, a note entry of a note manager, or a task entry of a task manager.

29. The electronic apparatus according to claim 1, where the electronic apparatus is a wireless accessory to a mobile terminal.

30. A method for providing tactile event notification for an electronic apparatus, the method comprising:
   detecting an event; and
   displacing, by a displacement device, a portion of the electronic apparatus in response to detecting the event, where the displacement device comprises at least one solenoid coil with a displaceable core to displace the portion of the electronic apparatus when the event is detected;
   where the displacing includes:
      displacing a key of the electronic apparatus by a first end of the solenoid coil when the event is detected,
      activating a switch of the electronic apparatus by a second end of the solenoid coil when the key is brought back to a non-displaced position after having been in a displaced position, and
      repeatedly displacing, by a displacement device, the key a predetermined number of times when the event is detected.

31. An electronic apparatus for tactile event notification, comprising:
   a processor adapted to detect an event; and
   a displacement device adapted to displace a portion of the electronic apparatus when the event is detected,
   wherein the displacement device comprises at least one solenoid coil with a displaceable core arranged to displace the portion of the electronic apparatus when the event is detected,
   where the electronic apparatus further comprises:
      a plurality of keys, wherein at least one key is arranged to be displaced by a first end of the solenoid coil when the event is detected, and
      a switch for activating a visual notification of the event on a display, wherein the switch is arranged to be activated by a second end of the solenoid coil when the at least one key is brought back to a non-displaced position after having been in a displaced position.

32. A method for providing tactile event notification for an electronic apparatus, comprising:
   detecting an event; and displacing a portion of the electronic apparatus in response to detecting the event,
where the displacing is performed by a displacement device that comprises at least one solenoid coil with a displaceable core,
where the displacing includes:
  displacing at least one key of a plurality of keys by a first end of the solenoid coil when the event is detected, and where the method further comprises:
  activating, by a switch, a visual notification of the event on a display, where the switch is arranged to be activated by a second end of the solenoid coil when the at least one key is brought back to a non-displaced position after having been in a displaced position.

* * * * *

UNITED STATES PATENT AND TRADEMARK OFFICE
CERTIFICATE OF CORRECTION

PATENT NO. : 7,660,609 B2  Page 1 of 1
APPLICATION NO. : 11/366603
DATED : February 9, 2010
INVENTOR(S) : Bilgi Karan et al.

It is certified that error appears in the above-identified patent and that said Letters Patent is hereby corrected as shown below:

Column 10, Line 22, "cal" should be "call".

Signed and Sealed this

Sixth Day of April, 2010

David J. Kappos
*Director of the United States Patent and Trademark Office*